United States Patent [19]

Giesken et al.

[11] 4,173,713

[45] Nov. 6, 1979

[54] CONTINUOUSLY EXPANDABLE SWITCHING NETWORK

[75] Inventors: Kenneth F. Giesken, Fairfield; John M. Cotton, East Norwalk, both of Conn.

[73] Assignee: International Telephone & Telegraph Corporation, Nutley, N.J.

[21] Appl. No.: 909,583

[22] Filed: May 25, 1978

Related U.S. Application Data

[63] Continuation of Ser. No. 766,396, Feb. 7, 1977, abandoned.

[51] Int. Cl.$^2$ .............................................. H04M 3/00
[52] U.S. Cl. .......................... 179/18 EA; 179/15 AQ; 179/15 AT
[58] Field of Search ....... 179/15 AQ, 15 AT, 15 AL, 179/18 EA, 18 E, 18 J, 18 GF, 18 G; 340/166 R

[56] References Cited

U.S. PATENT DOCUMENTS

| | | | |
|---|---|---|---|
| 3,458,658 | 7/1969 | Aro | 179/15 AQ |
| 3,727,006 | 4/1973 | Jacob | 179/18 J |
| 3,760,103 | 9/1973 | Condon | 179/15 AQ |
| 3,906,164 | 9/1975 | Philip et al. | 179/15 AT |
| 4,023,141 | 5/1977 | Hwang | 179/18 EA |

FOREIGN PATENT DOCUMENTS

1058893 2/1967 United Kingdom.

*Primary Examiner*—Thomas A. Robinson
*Attorney, Agent, or Firm*—John T. O'Halloran; Jeffrey P. Morris

[57] ABSTRACT

A telephone central office switching network and a basic switching element utilized therein is disclosed herein. The basic switch element has the capability of reflecting traffic entering any of the inlets thereto back to any other traffic inlet and the capability of connecting any of the inlets thereto to any of the outlets therefrom. The basic switch is implemented in the network incorporating the reflection technique, sometimes called a one-sided network in which the outlet from a switching stage is in a preferred embodiment connected to a higher order switching stage such that the outlets of the switching stages are progressively connected in a multistage configuration from the terminal stage into the folding point in increasing order, thereby enabling the outlets of the higher order stages to be used as reflection ports while simultaneously remaining available for connection to higher order switching stages without the necessity of recabling. A continuously expandable switching network is thus provided wherein incoming traffic penetrates the network only to the degree necessary to complete the required signal connection and is implementable either in space division configuration, time division configuration or any combination thereof, and utilizing either analog or digital encoding techniques.

16 Claims, 21 Drawing Figures

CONTINUOUSLY EXPANDABLE SWITCHING NETWORK

This is a continuation of application Ser. No. 766,396, filed Feb. 7, 1977, now abandoned.

BACKGROUND OF THE INVENTION

1. Field of the Invention

The present invention relates to the switching of space and time division multiplexed transmissions and more particularly, to a novel switching element and novel network configuration for implementing a substantially continuously expandable switching network in a telephone exchange, telephone central office, PABX, remote concentrator, data circuit switch or other device wherein a plurality of terminal interconnections are required.

2. Description of the Prior Art

Presently available time division switching networks utilize time-slot-interchange modules or space switching modules utilizing time shared space interconnections, usually two of the former modules and one of the latter or two of the latter modules and one of the former. U.S. Pat. No. 3,770,895 is illustrative of a time slot interchange of the prior art. U.S. Pat. No. 3,963,872 is illustrative of a folded multiple stage switching network of the prior art. These known prior art switching networks are incapable of unlimited growth without extensive recabling to accommodate major system size expansion.

Switching networks of the prior art are designed to cover particular size ranges, i.e., the number of lines that can be switched, whereas the present invention is adaptable to switch over a wide and expandable size range.

In accordance with the present invention, a small switching network, i.e., for a few hundred lines, may be economically constructed using only the minimum number of stages required for implementing such a small network. There is no upper limit from a network configuration standpoint to the expandability of such a small network, i.e., the network is readily expandable from a few hundred lines requiring a small number of stages to a large number of lines, i.e., 50,000 lines, requiring a plurality of stages. Also, a working small network can be readily expanded to a large working network without recabling as would be required in systems of the prior art.

A continuously expandable switching network configuration is described wherein the outlets of the stages comprising the network are connected only to the switches in higher level stages, thereby eliminating the need for recabling in the event of system expansion. The connections between terminals are accomplished by use of the reflection and the connection characteristics of the individual switching elements. By reflection characteristics, the capability of interconnecting two inlets within the switch is defined. This network is implementable with either analog or digital transmission schemes over either two or four wire traffic paths and with space and time switching and combinations thereof. In a preferred embodiment of this invention, a combined multistage space switch and time slot interchange switching network is described utilizing as individual switching elements thereof an integrated signal switch and control circuit by which traffic can be interconnected to another inlet or connected to an outlet. The described network configuration is applicable to either analog or digital traffic switching and is advantageous when employed in a four wire network as either a group switch, a concentrator, a deconcentrator or any other type of PCM switching unit requiring the capability of space and time switching to connect any time slot on any incoming multiplexed line to any other time slot on any other outgoing multiplexed line. The described switch may be incorporated in the network for switching both the forward and return paths of four wire interconnections by means of a controllable reflection point technique and a path selection control by means of control signals transmitted over the speech path to be controlled thereby eliminating extra control lines. Of course, if desired, such control signals could be transmitted over separate control wires. It is therefore a primary object of the present invention to provide a substantially continuously expandable switching network.

A further object of the present invention is to provide an expandable switching network in which modification of internal or external connecting links is not required for such expansion.

A further object of the present invention is to provide a multistage switching network in which the switching element outlets of any stage are connected to switching element inlets of higher order stages.

Yet another object of the present invention is to provide a multistage switching network in which incoming traffic penetrates the network to the extent necessary to complete required connections.

Yet another object of the present invention is to provide a switching element having a plurality of inlets connectable to a plurality of outlets, having a reflection capability of reflecting traffic entering on any inlet back to any other inlet, and a connection capability of connecting any inlet to any outlet.

Yet another object of the present invention is to provide a PCM (pulse code modulated) switch module which allows continuously expandable networks without recabling over a size range, i.e., the total number of terminals to be interconnected, of 100:1 or more and which is implementable as a group switch, a concentrator or a deconcentrator. Pulse code modulation is a type of pulse modulation wherein the modulating signal waveform is sampled at regular intervals, quantized into discrete steps and digitally coded into a series of pulses.

Yet another object of the present invention is to provide a PCM switch for connecting any time slot on any multiplexed line to any other time slot on any other multiplexed line.

Yet another object of the present invention is to provide a combined space and time switching module for switching both the forward and return paths of a four wire connection.

Yet another object of the present invention is to provide a combined time and space switch module having a path selection control accessible for control commands by means of the voice path with the consequent elimination of extraneous control paths.

The foregoing and other features and advantages of the invention will be apparent from the following more detailed description of the preferred embodiments of the invention as illustrated by the accompanying drawings.

BRIEF DESCRIPTION OF THE DRAWINGS

FIGS. 5A and 5B illustrate the switching matrix expansion by use of reflection/connection outlets wherein

DESCRIPTION OF THE PREFERRED EMBODIMENTS

Figure 1A:
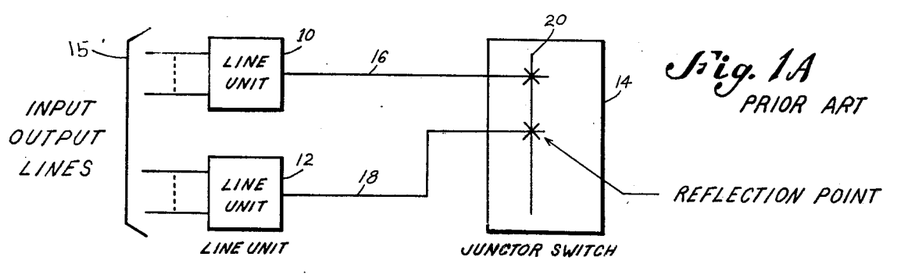
FIG. 1A is a simplified junctor switch of the prior art utilizing the reflection point technique.

The reflection point technique has been employed in the prior art ITT A1 crossbar networks, such as in a space division switch by the closing of two horizontals on one vertical. This is illustrated by FIG. 1A, wherein traffic on line units 10 and 12 are coupled to a junctor switch 14 via horizontal matrix lines 16 and 18 to a vertical line 20. Each line unit 10 and 12 may comprise a small network of crossbar switches as are well known in the prior art, having coupled thereto a plurality of input/output lines 15. The reflection concept is implemented by the coupling of traffic on line 16 to the junctor switch 14 wherein it is reflected off vertical line 20 and exits from the junctor switch via horizontal line 18.

Figure 1B:
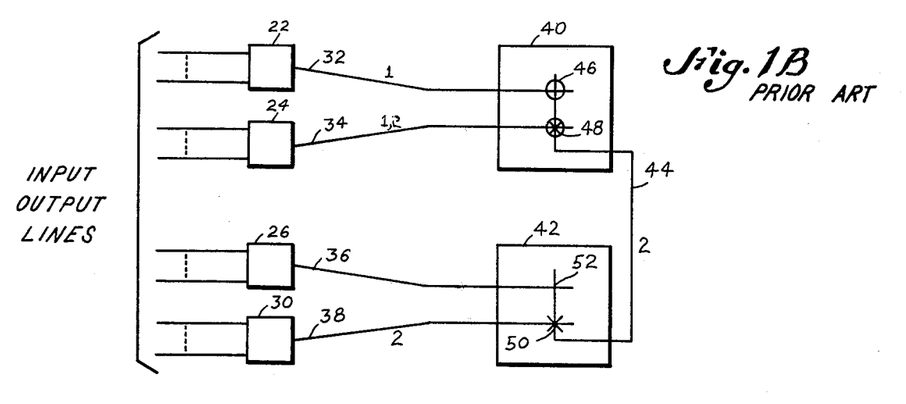
FIG. 1B is a prior art use of reflection and connection verticles in a switching network of the prior art.

An improvement on the prior art over the technique of FIG. 1A is shown in simplified form by FIG. 1B which is illustrative of the reflection point concept utilized by the ESR-1 PABX switching network of Standard Elektrik Lorenz A.G. In this system, the vertical lines are connected between switching modules at the same level in the network hierarchy, thereby limiting the maximum size to which the network can be expanded. Thus, a plurality of line units 22, 24, 26 and 30 are connected on respective horizontal lines 32, 34, 36 and 38 to switching modules 40 and 42. Module 40 serves to interconnect line units 22 and 24 by reflection, module 42 serves to interconnect line units 26 and 30 by reflection and modules 40 and 42 together with link 44 serve to interconnect line units 22 and 24 with line units 26 and 30.

The numerical designations (1) on lines 32 and 34 include other combinations and are equivalent to the intermodule connection of traffic on lines 32 and 34 between line units 22 and 24. For this condition, crosspoints 46 and 48 are closed. The numerical designations (2) on lines 34, 38 and 44 are equivalent to the intermodule connection of traffic on lines 34 and 38. For this condition, crosspoints 48 and 50 are closed while crosspoints 46 and 52 are open.

The prior art system of FIG. 1b, while utilizing the basic reflection technique, provides a system whereby the vertical of one switch is connected to another switch at the same level in the network hierarchy, i.e., to the same level switching stage, thereby limiting the maximum size to which the network can be expanded. In contradistinction to the aforedescribed prior art systems and in accordance with the present invention, it has been discovered that by connecting the reflection/connection verticals to horizontals of higher level switches, which higher level switches also have reflection/connection verticals, a continuously expandable switching network is obtainable.

As used herein, the terms input, output, inlet and outlet are defined as follows. An input is a port to a switch or combination of switches, which port carries signals from outside the switch into the switch, while an output is a port on a switch carrying signals from the switch. An inlet is a connection to a switch, having both an input port and an output port, which carry the signals relating to the two directions of transmission forming a full duplex communication path, and which connect to one side of a switch. An outlet is a connection to a switch having both an input port and an output port which carry the signals relating to the two directions of transmission forming a full duplex communication path and which connect to the side of the switch opposite to the inlet.

Referring now to FIGS. 2A through 2D, a folded network is described which is illustrative of the reflection/connection technique of the present invention in which the outlet from any switch of a particular stage is not connected either to the same or to a lower tier stage, and wherein the sequence of numbering of the stage is from the terminal stage into the folding point in increasing order. It is to be understood that this network configuration is greatly simplified to illustrate the network expandability. By way of definition, every switching matrix consists of a number of depths, ranks, or stages of switches through which the path connecting two terminals must pass. In a non-folded network, the connecting path from an originating terminal or inlet to a terminating terminal or outlet crosses each stage once only and the path from the originating terminal to the terminating terminal always crosses any one stage in one direction only. In a folded network, the connecting path from an originating terminal to a terminating terminal may cross any stage in either direction and will cross at least one stage at least twice, once in each direction.

In accordance with the present invention, the outlets of the highest numbered switching stage are used as reflection points; however, these outlets are always available for connection to yet a higher numbered stage without circuit modification. Thus, the outlets may be utilized to connect to another switch or may be considered as folding points. A folding point may be defined as that point in a folded network at which a signal switched through the network reverses direction through the network, i.e., stops its progression toward a higher level stage. Additionally, the reflection and connection capability of the switch may be utilized on alternate connections.

Figure 2A:
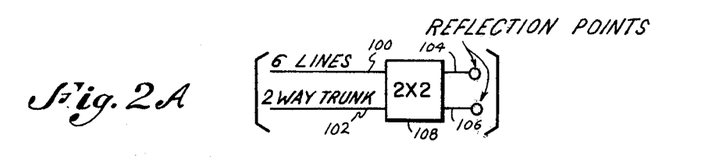
FIGS. 2A, 2B, 2C and 2D are simplified switching network configurations illustrative of the network expandability of the reflection technique of the present invention wherein exemplary single block, two block, three block and eight block switching network configurations are illustrated, respectively.
Figure 2B:
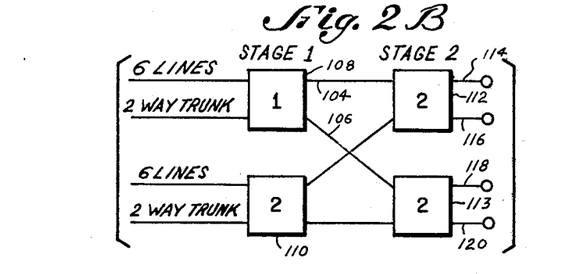

FIG. 2A is illustrative of a 2×2 line switch having two inlets, 100 and 102, and two reflection points, 104 and 106. Reflection ports 104 and 106 are also connection verticals as will be described. In the event that each of the inlets 100 and 102 were a twenty-four channel time division multiplex (TDM) line, then switch 108 could provide a switching capability of 150 lines with suitable concentration, as is well known, on one inlet and up to twenty-four trunk lines on the other inlet with full interconnectability therebetween as will hereinafter be described. Another example of the reflection/connection technique is the case in which inlet 100 has coupled thereto a circuit having six lines concentrated thereon, while inlet 102 comprises a two-way trunk line to another switching location in an analog or non-multiplexed configuration. By using only one of the reflection ports 104 or 106, both line-to-line (revertive) or line-to-trunk, calls may be implemented one at a time. This network is continuously expandable, for example, to twelve lines and two trunks as illustrated by FIG. 2B, wherein additional switches 110, 112 and 113 of identical configuration are added on to switch 108 and which results in expansion to two stages. For purposes of description, the switches added to expand to a second stage of switches are identified by the numeral 2. When interconnection among channels within switch 108 are required, the outlets 104 and 106 of switch 108 are used as reflection points, i.e., for telephone calls among the original lines and trunks. The reflection properties of switch 108 may still be utilized calls are also switched among the new added switches in similar manner. However, for calls between a terminal served by switch 108 and a terminal served by switch 110 having coupled thereto the same number of lines and trunks as are connected to switch 108, then the outlets of switches 108 and 110, i.e., both first stages, are switched through to a common second stage switch, either switch 112 or 113. The reflection points of the second stage at 114, 116, 118 and 120 are used to complete the connection. Thus, it can be seen that for connections between channels on primary switches 108 and 110, an outlet on each of said switches is used as connection ports to a common higher tier stage switch where one of the outlets of such higher tier stage is utilized as a reflective port.

Figure 2C:
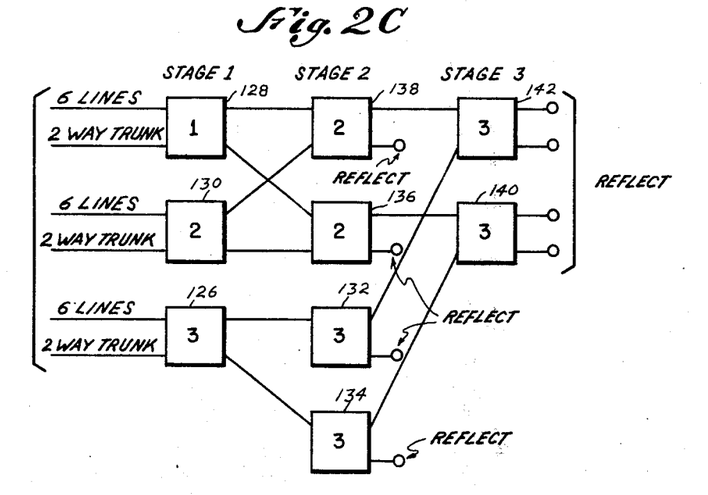
Figure 2D:
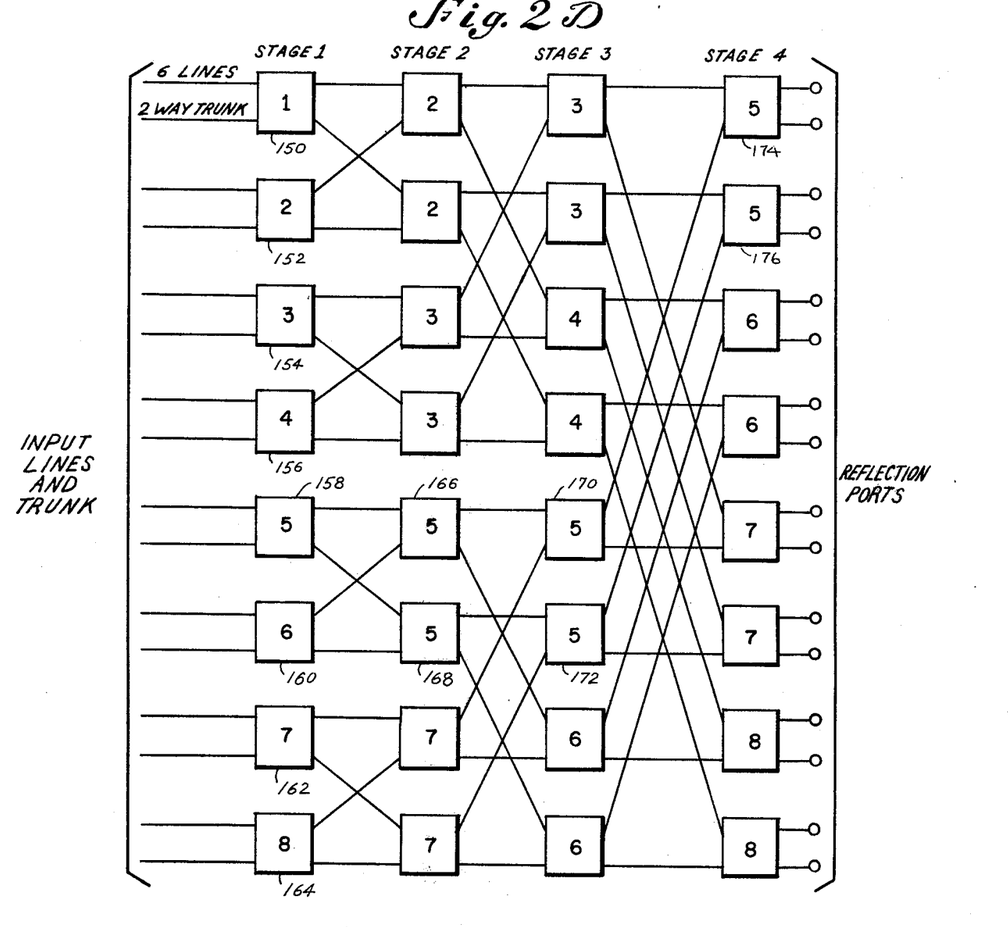

FIGS. 2C and 2D are illustrative of the continuous expansion of the switching network to three and eight primary switches, respectively. This expansion technique without rearrangement either of internal or external connecting links, can be achieved with respect to space and time division switching and to any desired size basic switching element. With reference to FIG. 2C, the three primary switching block configuration illustrated provides a capability of six additional lines and another additional two-way trunk by virtue of the third switching block 126. Two-thirds of the incoming traffic from switch 126 would statistically be destined for the first two switches, 128 and 130, since two-thirds of the incoming lines and trunks to the switching network are coupled to switches 128 and 130. However, since each inlet provides one unit of traffic, then two-thirds of the two inlets is four-thirds of a traffic unit which exceeds the traffic capability of one switch outlet; hence, two secondary stage switches 132 and 134 are provided for the third primary switching unit 126. As will become apparent with respect to FIG. 2D, the addition of a fourth switching unit will not result in the rearrangement of any existing links. The switching blocks 132 and 134 of the second stage and switching blocks 140 and 142 of the third stage are of the same configuration as are the primary stage switching blocks. The network expandability without rearrangement of existing connecting links is illustrated as extended to eight primary switching blocks, each of which may, for example, have coupled thereto six lines and a two-way trunk line as illustrated in FIG. 2D. The eight primary switching blocks 150 through 164 of the first stage of the switching network may be identical in configuration to the switching units of FIGS. 2A through 2C. In contradistinction to a single stage folded network, the switching network configuration of the present invention is more economically expandable since the cost of a single stage folded network in terms of crosspoints per line increases linearly with the number of terminals, i.e., inlet ports or lines, while the present network, in terms of crosspoints per line, grows approximately as the logarithm to the base 2 of the number of terminals. This relationship is illustrated by the following table for the eight block network of FIG. 2D.

| Primary Blocks ($2^N$) | No. Switches Added | Total Switches In Network | No. Switches In Network Per Primary Book | N where N = (Stage No. −1) |
|---|---|---|---|---|
| 1 | 1 | 1 | 1 | 0 |
| 2 | 3 | 4 | 2 | 1 |
| 3 | 5 | 9 | 3 | 1 |
| 4 | 3 | 12 | 3 | 2 |
| 5 | 7 | 19 | 3.8 | 2 |
| 6 | 5 | 24 | 4 | 2 |
| 7 | 5 | 29 | 4.1 | 2 |
| 8 | 3 | 32 | 4 | 3 |
| 16 | 0 | 80 | 5 | 4 |
| 32 | 0 | 192 | 6 | 5 |

The switching blocks added to the network in stages 2, 3 and 4 are identified by numerals corresponding to the addition of the primary switching block, the addition of which requires the addition of the corresponding higher tier stage switching. Thus, for example, the addition of primary switch 158, the fifth primary switch, results in the addition of second stage switches 166 and 168, third stage switches 170 and 172, and fourth stage switches 174 and 176.

Figure 3:
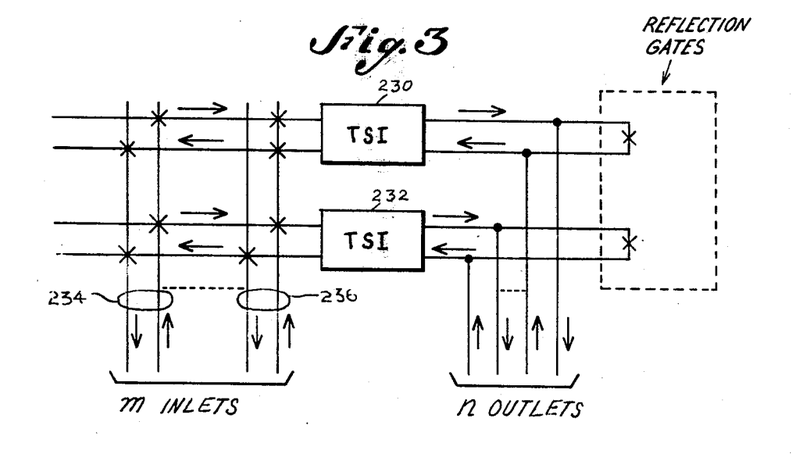
FIG. 3 is illustrative of a switch element having space switch on the inlet side of a time slot interchange.

Referring now to FIG. 3, the characteristics of the elemental switch, a plurality of which constitutes the overall switching network, is illustrated for a preferred embodiment. Each elemental switch must function as a space switch capable of switching m inlet connections to n outlet connections. Additionally, each elemental switch must comprise at least one time slot interchange (TSI) unit for each inlet or outlet. It is to be understood that the designation of inlets and outlets is exemplary only and that the number of TSI's would correspond to the smaller number of m or n. In the event that a number of TSI's equal to the larger of m or n or in any event, greater than the smaller of m or n were used, the network would still be functional, however at reduced efficiency. Finally, each elemental switch must include enabling gates i.e., crosspoints for signal reflection. The connection/reflection gates are illustrated in FIG. 3 in simplified form; however, it is to be understood that each of said gates corresponds to the logical implementations described with reference in part to FIG. 7A. A concentration capability may be implemented when m is greater than n and an expansion capability implemented when n is greater than m. Additionally, for the concentration case, when a symmetrical (m×m) switch is available, only n of the m outlets need be used, since the non-utilization of the remaining outlets would result in only a number of inexpensive gates being non-utilized. Furthermore, an m×2n switch may be achieved by connecting the inlets of the necessary additional switches to the inlets 234 and 236. Of course, the value of m can vary widely with m being any number of inlet connections to the switches and n being any number of outlet connections from the switch.

Figure 4:
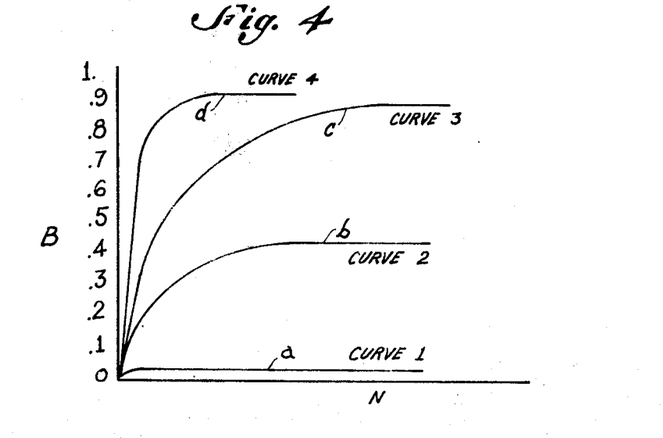
FIG. 4 is a graph of blocking versus the number of stages of switching for different levels of traffic intensity.

Referring now to FIG. 4, a graph of blocking B versus number of switching stages N for four levels of link occupancy is illustrated. The term blocking as used herein may be defined as the inability to interconnect the idle lines or trunks connected to a network because of the impossibility for whatever reason to achieve such interconnection. The term nonblocking network as used herein may be defined as a network in which there is at all times at least one available path or link between any pair of idle lines or trunks connected thereto, regardless of the number of paths already occupied.

Two important aspects of network operation are the ability of the network to respond to varying traffic levels and the effect of an increased number of stages on the network operating characteristics. In accordance with the present invention, as the number of network stages increases, with each stage comprising a plurality of switches in a switching network, each of which has an identical parallel function to another switch in the switching stage of equal rank, the blocking does not continuously increase but approaches an asymptotic value between zero and one depending upon switch element size and traffic intensity. The term traffic intensity as used herein may be defined as the traffic quantity in one or more traffic paths per unit of time and is generally measured in Erlangs where one Erlang is the intensity in the traffic path continuously occupied or in one or more paths carrying an aggregate traffic of one call hour per hour, one call minute per minute, etc. In accordance with the present invention, the network blocking characteristic B for a particular number of switching stages N for low, medium and high traffic levels is such that a relationship exists between the blocking characteristic and N, where N is the number of stages such that once a maximum blocking level is reached, the network blocking will not further increase, i.e., the network blocking versus N curve becomes asymptotic at a maximum blocking level. This is illustrated by FIG. 4 for four levels of traffic intensity with curve 1 representative of low traffic intensity, curve 2 representative of low to medium traffic instensity, curve 3 representative of medium to high traffic intensity and curve 4 representative of high traffic intensity. As the switch size in each stage in increased, the blocking probability becomes lower for a given traffic intensity E.

Figure 5A:
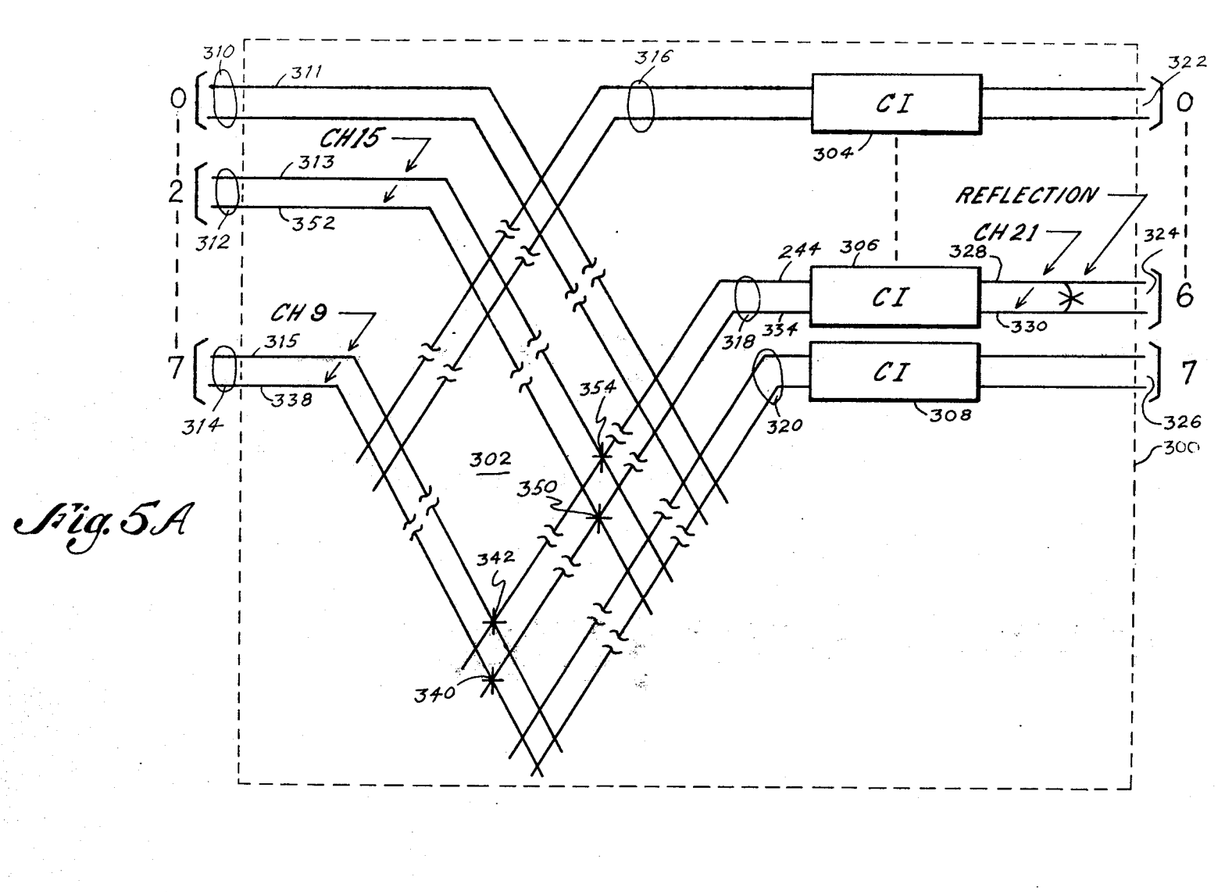
FIG. 5A is a single switching module and FIG. 5B is an expanded switching module.
Figure 5B:
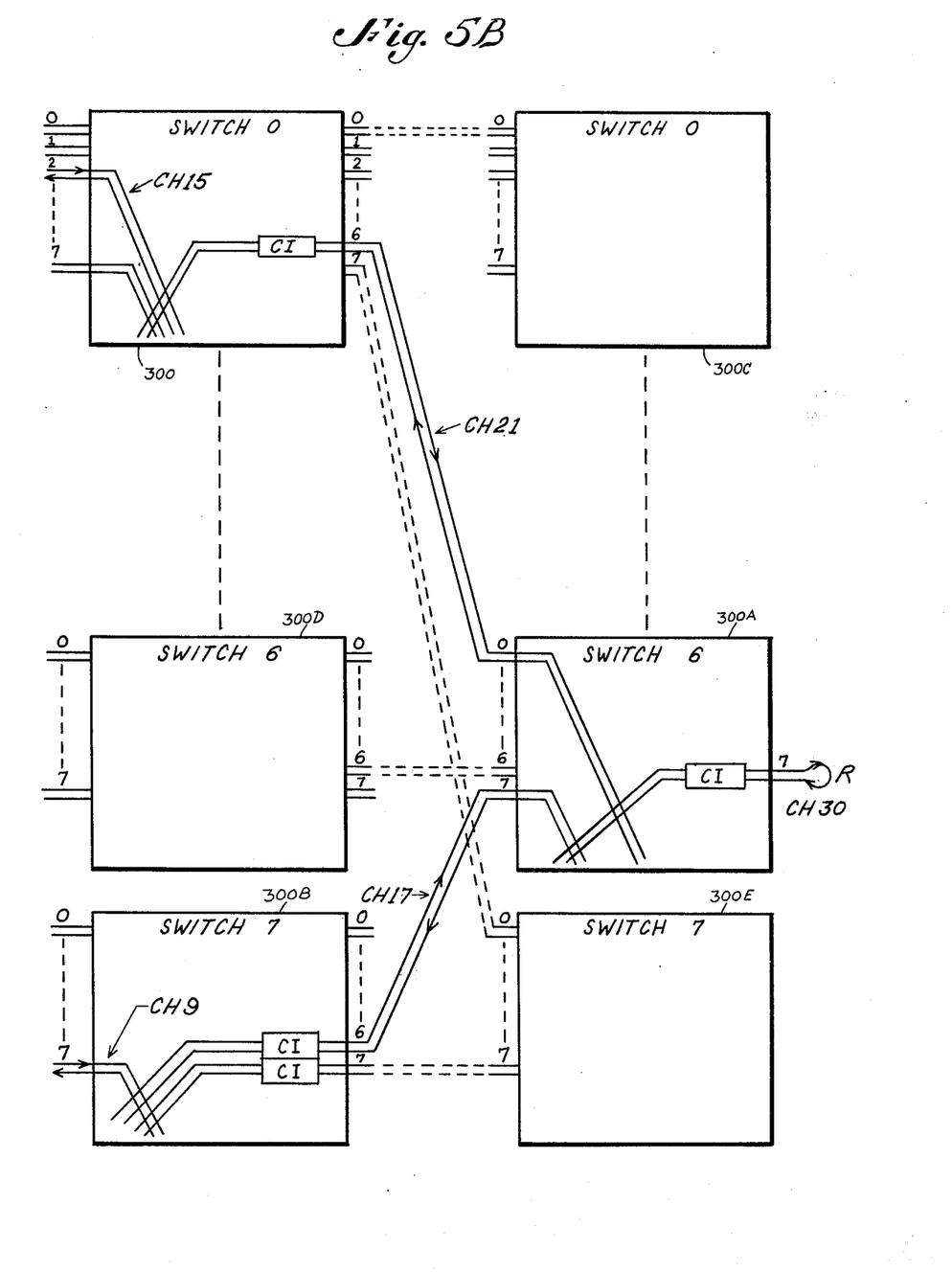
Figure 6A:
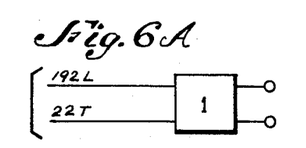
FIGS. 6A through 6E are illustrative of a multistage switching network expansion configuration in accordance with the present invention.
Figure 6B:
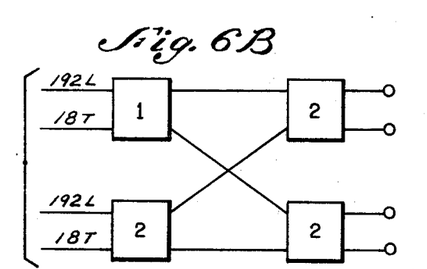
Figure 6C:
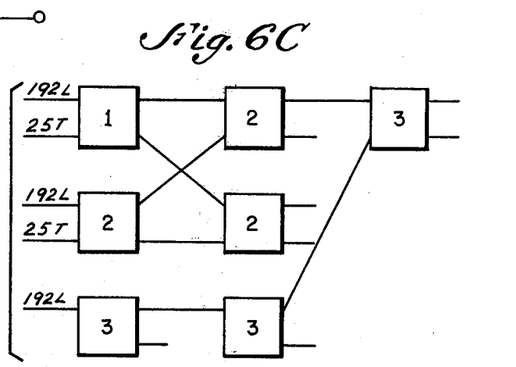
Figure 6D:
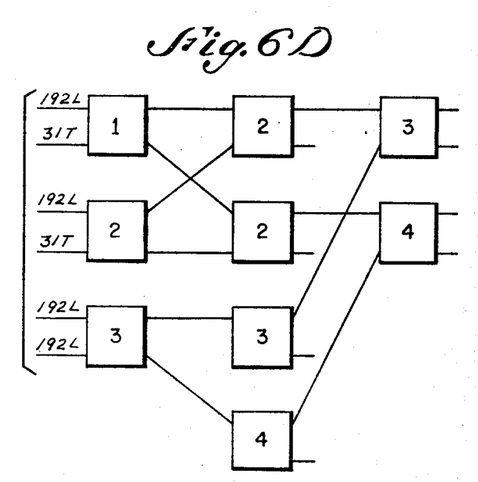
Figure 6E:
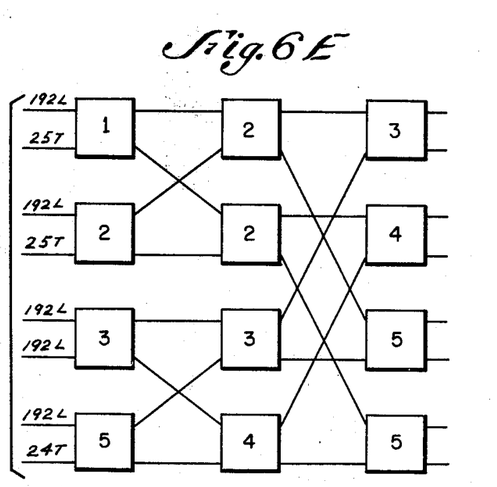

Referring now to FIGS. 5A and 5B, the network expansion by means of the reflection/connection outlet is illustrated. Speech connections in switching block 300 are provided by the TDM space matrix 302 and the exemplary channel interchange units 304, 306 and 308. Each inlet (of which 310, 312, 314 are three examples) and each outlet (of which 322, 324, 326 are three examples) have input and output connections which carry the input and output paths of the four wire connection. As used herein, the terms channel interchange units and time slot interchange units are interchangeable. Each switching matrix module 300 will provide for thirty-two-channels on each of eight inlets of which three are illustrated at 310, 312, and 314 (inlets 0, 2 and 7, respectively) for simplicity of description.

Data on inlets 310, 312 and 314 at the inputs 311, 313 and 315 thereof, respectively, shown as inlets 0, 2 and 7 of eight inlets may be switched to the inlets 316, 318 and 320 of the channel interchange units 304, 306 and 308 respectively via the time division space switching matrix 302. Thus, data at any of the switching module inputs may be selectively coupled to any of the inputs of the channel interchange units for each of the channel times. Three channel interchange units 304, 306 and 308, one for each of the illustrated switching module outputs illustrated at 322, 324 and 326, introduce a predetermined delay, effectively switching data from a time channel on the input thereto to a different time channel on the output such that no two channels occupy the same position in time on each channel interchange output. For example, data on input 313 of inlet 312 is switched via crosspoint 354 to input 244 of channel interchange 306 inlet 318. Channel 15 data on input 313 is effectively converted by the properties of the channel interchange 306 to channel 21 data on output 328.

The channel interchange units may comprise well known units such as are described in U.S. Pat. No. 3,740,483, and which patent references a number of well known time slot interchange references. In accordance with the present invention, the output 328 of channel interchange 306 outlet 324, for example, may be controllably forced into a changed impedance state to connect to the input 330 of channel interchange 306 outlet 324 as illustrated. The channel interchange can cause, for example, the data on input 330 for channel 21 to be converted to the data in time channel 9 on the output 334 of inlet 318. Switch 302 by means of crosspoint 340 switches the data from output 334 to output 338 of module inlet 314. This describes the data path corresponding to two wires of the four wire path. The other half of the data path is described as follows. Data on input 315 of inlet 314 at channel time 9 is switched via crosspoint 342 to the input 244 of inlet 318 of channel interchange unit 306. The channel interchange unit 306 transposes in time the data on channel 9 to channel 15 on output 334 of inlet 318 and couples same to crosspoint 350 which couples the data in channel 15 to output 352 of inlet 312.

The control is such that independent access is provided from each of the switch matrix module inlets 310, 312, 314, etc. to the channel interchange inlets, all in a predetermined format.

Referring now to FIG. 5B, the expanded switch of 5a is illustrated with an exemplary new traffic path and connections therefor when a plurality of like switching modules are interconnected in a multistage switching network. Thus, it may be seen that a traffic path is established from input channel 15 of inlet 2 of module 300 to output channel 21 of outlet 6 of module 300. Outlet 6 of module 300 is connected to inlet zero of module 300A. Input channel 21 of inlet zero of module 300A is connected to output channel 30 of outlet 7 of module 300A. Thus, channel 30 of outlet 7 of module 300A becomes the reflection point for the described connection as illustrated. The connection is completed via input channel 30 of outlet 7 of module 300A which is coupled to output channel 17 at inlet 7 of module 300A. Inlet 7 of module 300A is connected to outlet 6 of module 300B, which connects input channel 17 of outlet 6 to output channel 9 of inlet 7 of module 300B. This illustrates the connection of input channel 15 of inlet 2 of module 300 to output channel 9 of inlet 7 of module 300B by reflection at channel 30 of outlet 7 of module 300A. The return half of the four wire connection is the complement of this sequence. The path selected through switch 300 as described in relation to FIG. 5A before expansion of the network is equally possible for switch 300 after the expansion shown in FIG. 5B. The choice of reflection or through transmission at outlet 6 of module 300 will depend upon the path required. Thus, it has been shown that the switching module of FIG. 5A is expanded modularly to a multistage configuration as a consequence of the reflection technique permitting any requisite input interconnection while simultaneously leaving reflection outputs available for further expansion by connection to a higher order stage. Other switching modules 300C, 300D are of like configuration as the aforedescribed modules.

Referring now to FIGS. 6A through 6E, distribution networks wherein each switching block is comprised of a 2×2 switch illustrates quantitative examples of the present invention. Of course, in actual practice, larger switches in the order of 8×8, 16×16, 32×32, etc. could be utilized depending upon packaging, cabling and other economic considerations. For 192 lines on a thirty-two channel carrier at a traffic density of 0.1 Erlang/line, a traffic density of 0.6 Erlang for each of the thirty-two channels results. Assuming that fifty percent of the traffic is intraoffice, then trunk traffic is 19.2 Erlang divided by two, or 9.6 Erlangs per 192 line carrier. If trunk traffic is one-way over one group in each direction, each trunk group would require the capability to carry 4.8 Erlangs per 192 lines. The following table refers to FIGS. 6A through 6E of the combined time and space network of the present invention.

Figure 7A:
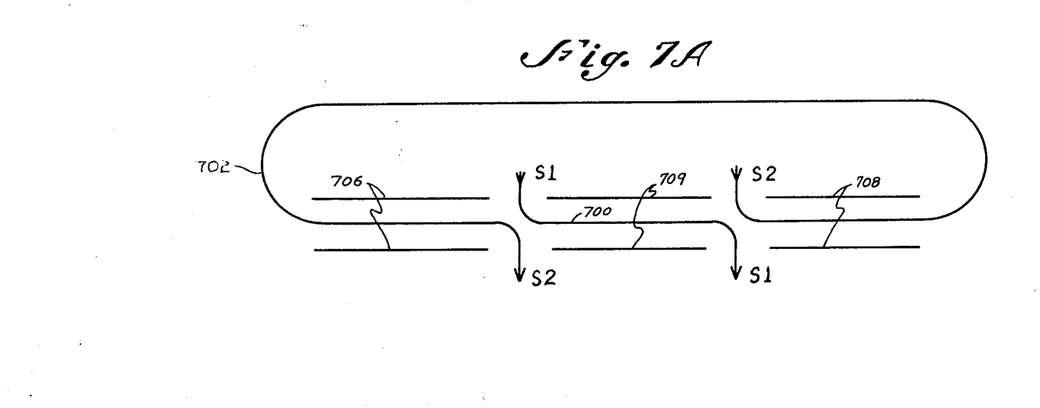
FIG. 7A is a representation of a four wire path complementary delay.
Figure 7B:
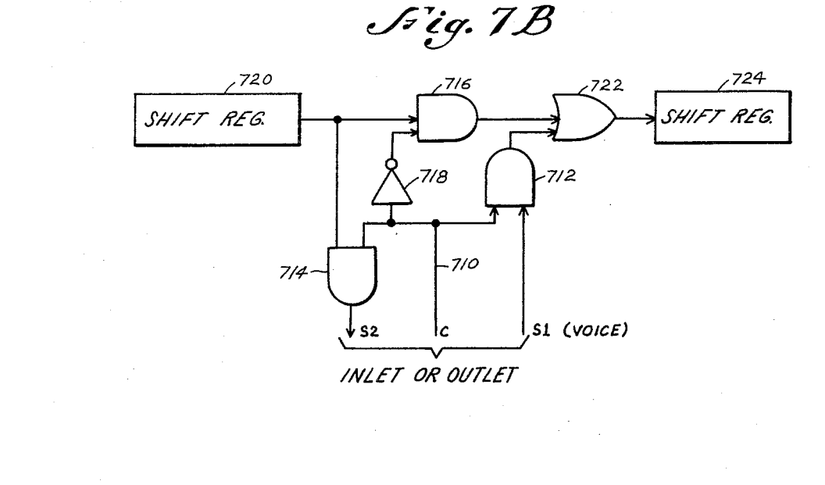
FIG. 7B is illustrative of the control logic for a single entry or exit point.
Figure 7C:
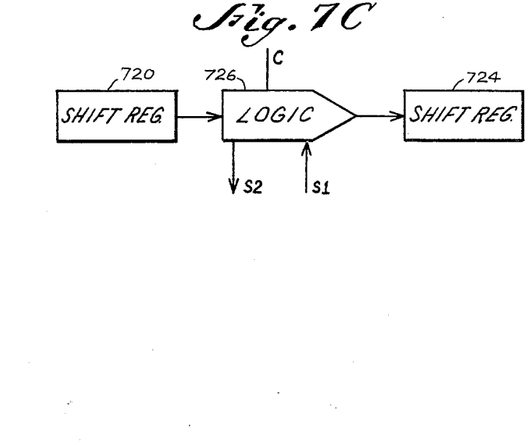
FIG. 7C is an equivalent logical representation of the control logic described with reference to FIG. 7B.

Logic for implementing this delay is illustrated by FIG. 7B. Each signal entry and exit point has the capability of entry, extraction or coupling a presently existing signal through the switch. A time slot interchange control signal C on line 710 is coupled to AND gates 712 and 714 and to AND gate 716 via an inverter 718. A digitized voice signal S1 is AND'ed with the control signal at AND gate 712, while S2 is AND'ed with the control signal at AND gate 714. The digitized voice signal S2 is coupled from a shift register 720 to AND gates 714 and 716, and is AND'ed at gate 716 with the inverted control signal. The output of AND gate 716 (signal S2) is OR'ed with the output of AND gate 712 signal (S1) at OR gate 722. Thus, either S1 or S2 is coupled through to shift register 724. The simplified logic of FIG. 7C is illustrative of shift registers 720 and 724 and the aforedescribed logic 726, and will be utilized hereinafter. When the described control logic is for an inlet, the control signal in line 710 is a selected stored control signal; however, when the described control logic is for an outlet, the control signal is a reflection control.

Figure 8:
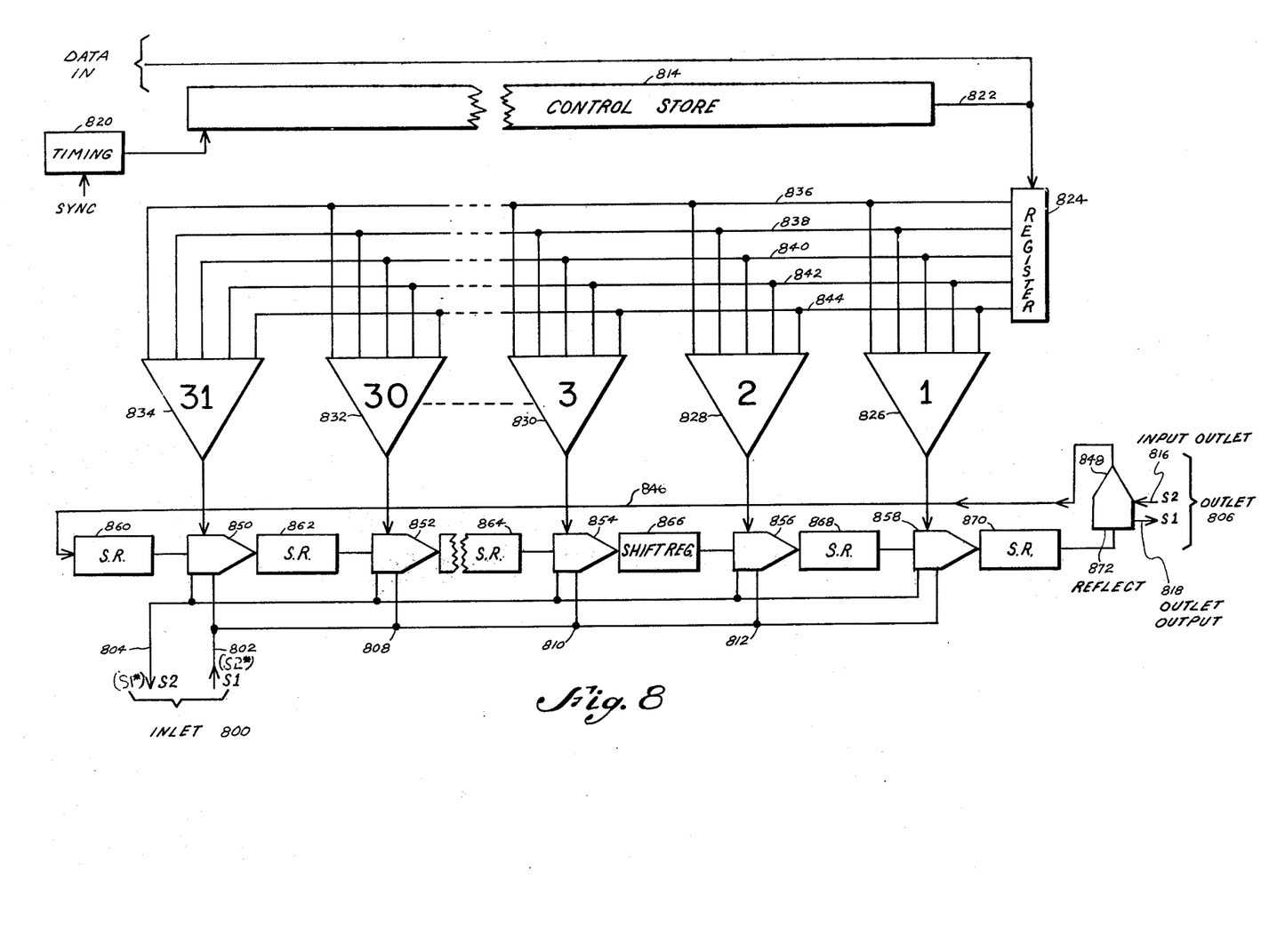
FIG. 8 is a time switch control circuit for a four wire delay line time switch utilizing the switching logic described with reference to FIG. 7B.

FIG. 8 is illustrative of a time switch and its associated control gating logic as described with reference to FIG. 7B for a multiple channel four wire configuration. The input signal S1 is coupled to the switch inlet 800 input line 802 while the S2 output, the return path of the four wire connection, is extracted from the switch inlet output line 804. Outlet 806 includes an outlet input line 816 and an outlet output line 818. The signal delay for signal S1 between inlet 800 input 802 and outlet 806 output 818 is selectably variable by selecting the desired signal input point 802, 808, 810, 812, etc. or other input points (not shown) in the delay line time switch, under the programmed control of control store 814, which contains the addresses of the signal input points in a predetermined and variable order. By accessing the address of the desired signal input point from the control store 814, signal S1 is entered into and S2 is extracted from the selected access point in the delay line.

| FIG. | Number Lines | Line Brlangs | Trunk Traffic | One-Way Traffic | Number Trunks (1% blocking probability) | Total Number Trunks | Number Switches |
|---|---|---|---|---|---|---|---|
| 6A | 192 | 19.2 | 9.6 | 4.8 | 11 | 22 | 1 |
| 6B | 384 | 38.4 | 19.2 | 9.6 | 18 | 36 | 4 |
| 6C | 576 | 57.6 | 28.8 | 14.4 | 25 | 50 | 7 |
| 6D | 768 | 76.8 | 38.4 | 19.2 | 31 | 62 | 9 |
| 6E | 960 | 96.0 | 48.0 | 24.0 | 37 | 74 | 12 |

A switch in accordance with a preferred embodiment of the present invention may be implemented on a single LSI chip, combining both space and time switching and may be cascaded and interconnected to form a continuously expandable network of, for example, two thousand to one hundred thousand lines. Functionally, the channel interchange portion of this switch can be operative as a delay line which, whether implemented by charge coupled devices (CCD) or as an MOS dynamic shift register performs the complementary delay required to produce a four wire path as shown by FIG. 7A in which two signal inputs are illustrated by S1 and S2 on lines 700 and 702, respectively, whereby S1 and S2 have variable delays illustrated for S2 at 706 and 708 typically from 5 to 125 microseconds, while the delay of signal S1 is illustrated at 709. The total delay 706 plus 708 plus 709 is typically 125 microseconds. The delay selected shifts data between channels.

The control store 814 is timed by a timing circuit 820 to be synchronous with the speech delay line such that the address to be selected for each S1 input point is coupled from the control store 814 via line 822 to a serial-to-parallel shift register 824. The output of register 824 is used to select and operate one of the logic gating circuits which are provided for each of the thirty-two channels controlling the selected input gates 802, 808, 810, 812, etc. These control signal logic gating circuits are illustrated for channels one, two, three, thirty and thirty-one at 826, 828, 830, 832 and 834, respectively. The parallel output from register 824 is coupled to gates 826, 828, 830, 832 and 834 via lines 836, 838, 840, 842 and 844. Line 846 serves as the delay line return line from reflection gate 848. A synchronization signal supplied to timing circuit 820 serves to match the speech sample rate and the control code rate of the control store 814 in time. The two rates need not be bit synchronous since the two codes may differ, i.e., the speech sample may comprise eight bits, while the control code may comprise five bits. Each signal insertion, extraction and bypassing switch 850, 852, 854, 856, and 858 between the input and output delays 860, 862, 864, 866, 868 and 870 associated therewith provides the mechanism to allow the selection of the insertion/extraction point of the S1 and S2 signals, respectively, to provide the required amount of delay between inlet and outlet for S1 and the complementary delay of the return path for signal S2. The logic 848 enables signal reflection at the switch output when the path chosen between calling and called subscriber requires the folding of the path at this point in the network.

The reflection of a particular connection, when desired, is accomplished by the activation of control lead 872 of the reflection gate 848 at the appropriate time. By way of example, a sample of the signal S1 is entered on input 802 of inlet 800 and is to be reflected and returned from output 804 of inlet 800 at a predetermined later, time, such as two channel times later as the signal S1* at the same channel time when the complementary signal S2* (which is a sample of the signal in the other direction of conversation) is entered at input 802 on inlet 800 and output at 804 on inlet 800 as signal S2 at 30 channel times later, which is representative of thirty-two minus two channel times, at the same channel time when the next sample of S1 is being entered at 802. To accomplish the foregoing, the selection gate 826 activates the input-/output logic 858 to insert S1 into the delay line and reflection control 872 on reflection gate 848 is activated one channel time later to reflect S1 into path 846. Selection gates 834 are then activated to control input/output logic 850 one channel time later to extract signal S1 and place it as S1* on the output 804, while simultaneously inserting the signal S2* on input 802 into the shift register delay line 862. Upon the expiration of thirty additional channel times, selection gates 826 will again activate input/output logic 858 to extract the signal S2* and output S2* on output line 804 as signal S2. Simultaneously with the foregoing, the next sample of S1 from input line 802 is inserted into shift register delay 870. The described switch thus transmits and reflects signals S1 and S2 in accordance with the requirements of the particular switching path as determined by the control storage 824.

Digitally encoded speech and control messages to direct the selection of switching module interconnection paths and channel interchange delays coupled via the switch module interconnections are encoded for each channel into sixteen serially transmitted bits. Typically, 8k frames per second are transmitted, with thirty-two channels per frame and 16-bits/channel. Timing is provided such that channel O, for example, occupies the same time slot (or period) on both the input and output connections. The channel interchange permits the 16-bits contained by each channel to be controllably transferred to a different channel by the introduction of delay into the bit stream. Such delay (for the thirty-two channel case) is a minimum of one channel period and a maximum of thirty-one channel periods. Reflection is accomplished by controllably changing the impedance switch outlets corresponding to either channel interchange to the high impedance state and connecting together the output and input of the selected channel interchange outlet.

Figure 9:
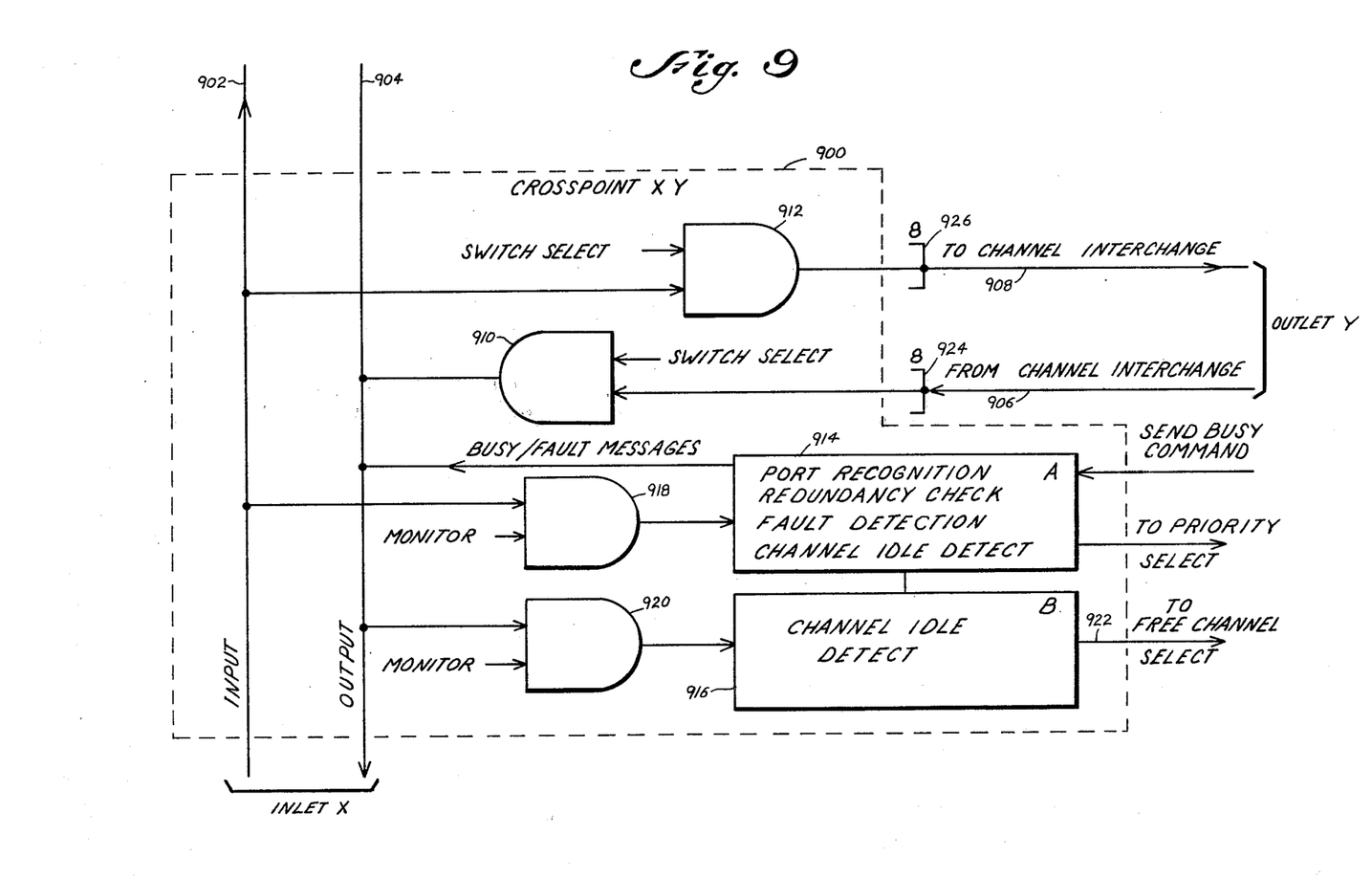
FIG. 9 is a logic and block diagram of a network crosspoint.

Referring now to FIG. 9, a typical time division space crosspoint xy utilized with the time switch hereinbefore described, is illustrated at 900 for the crosspoint of inlet x comprising input line 902 and output line 904 and outlet y comprising input line 906 and output line 908 from and to the associated crosspoint channel interchange (hereinbefore described), respectively. Switch 910 has coupled thereto as one input a switch select signal from the control storage and the output via line 906 from the channel interchange unit associated therewith and has an output coupled to the output line 904 of inlet x. Switch 912 has coupled thereto a switch select signal from the control store and the signal on the input line 902 of inlet x and has an output therefrom on line 908 to its associated channel interchange unit. Output and input switches similar to 910 and 912 from up to seven other inlets may be connected to lines 906 and 908 at commoning points 924 and 926. The input and output lines 902 and 904 of inlet x are also coupled to a port recognition redundancy check fault detection circuit 914 and to a channel idle detection circuit 916 via AND gates 918 and 920, respectively, with the other input to said AND gates 918 and 920 being a monitor for enabling the gates at desired times.

The port recognition and redundancy check fault detection circuit 914 which may be of conventional design is provided to detect messages on input 902 directed to the control circuits associated with outlet y, to check the coding of messages to determine that such messages do not contain errors, to detect idle channels on the inlet input 902, and to output signals on inlet output 904 to indicate the busy/free condition of outlet y. Port recognition and redundancy check fault detection circuit 914 receives commands such as a send busy command from the control circuits associated with outlet y and consequently couples out a signal indicative of a busy/fault message to line 904. When circuit 914 recognizes a selection request message on input line 902 destined for outlet y, circuit 914 couples a priority select signal to a crosspoint priority control circuit which arbitrates among simultaneous requests on more than one inlet for output to outlet y. The output of channel idle detect circuit 916 is coupled to a free channel selection circuit via line 922.

Figure 10:
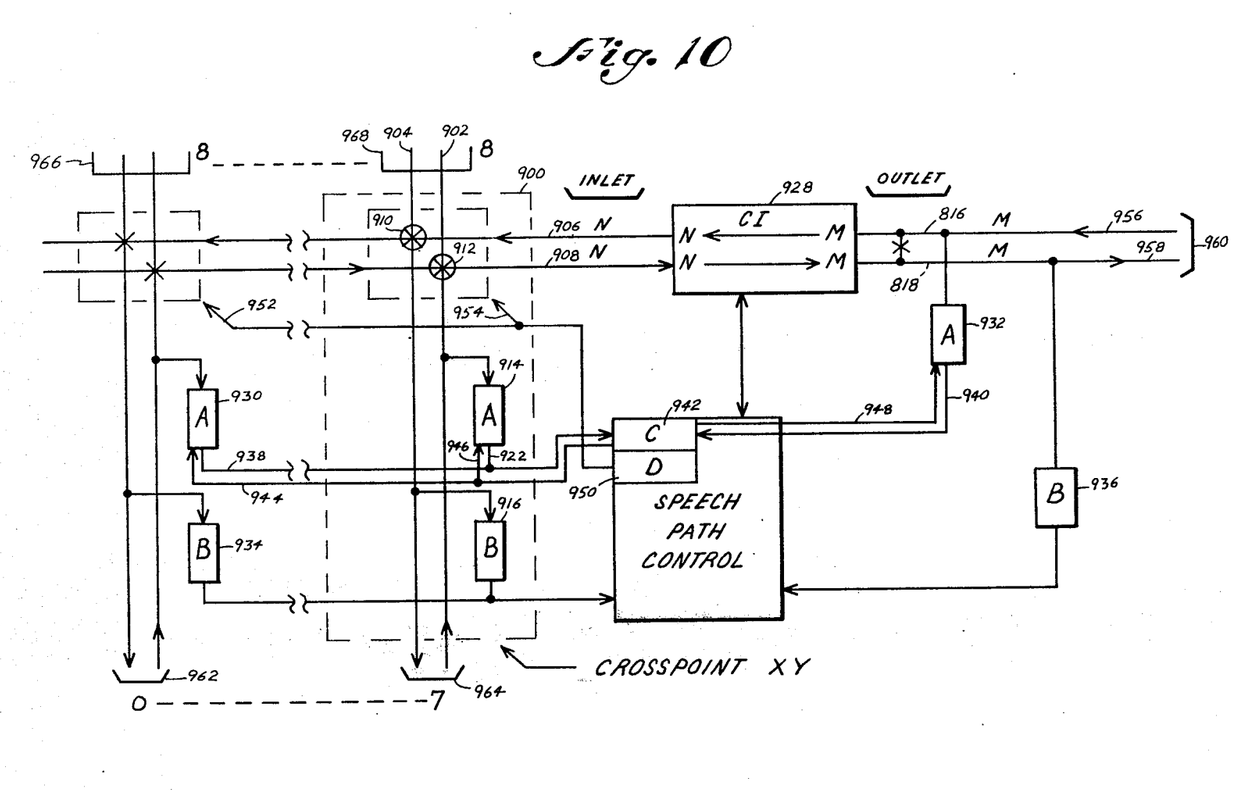
FIG. 10 is a block diagram of the network crosspoint of FIG. 9 incorporated within a network matrix.

A matrix of crosspoints xy as described with reference to FIG. 9 is illustrated by FIG. 10 wherein one representative outlet 960 and its control out of a possible eight other outlets in a matrix of eight inlets by eight outlets is shown connected to two inlets, 962 and 964 out of the possible eight inlets, zero through seven. Crosspoint xy illustrated at 900 corresponds to the crosspoint described with reference to FIG. 9. Also as hereinabove described with reference to FIG. 9, eight such crosspoints may be connected to the time switch (channel interchange) 928 via lines 906 and 908. Time switch 928 is described with reference to FIG. 8. The port recognition redundancy check fault detection channel idle detection circuits at 930 and 932 operate in like manner as circuit 914 described with reference to FIG. 9, and channel idle detection circuitry 934 and 936 operate in like manner as does the channel idle detect circuit 916, also described with reference to FIG. 9. The outputs 922, 938 and 940 of port recognition circuits 914, 930 and 932, respectively, are indicative of the receipt of messages at those respective circuits requesting connection to channel interchange 928 and are individually and separately connected to the crosspoint seizure priority control circuit 942. Upon receipt of simultaneous requests on two or more lines, circuit 942 is operative to select one of the requesting inlets and commands the sending of busy signals to the other non-selected requesting inlets by means of signals on lines 944, 946, or 948 as the case may be, to the respective circuits 930, 914 and 932 as appropriate, which busy signals are applied to the respective output lines on the crosspoint inlets as described with respect to FIG. 9. Crosspoint selection circuit 950 accepts and stores in a control delay line therein of like design to control store 814 described with reference to FIG. 8, the crosspoint selected by crosspoint selection circuit 942 for each of the thirty-two channel periods, and will open and close the selected crosspoint for each channel period by coupling signals onto the appropriate control lines 952, 954, etc. Signals on input 956 of outlet 960 may include path selection control signals received from a higher stage switch after reflection and which signals are recognized by previously described circuit 932. Outlet 960 thereby forms one of the inlets of such higher stage switch. Channel idle detect circuits 934 and 936 perform the same function as does channel idle detection circuit 916 described with reference to FIG. 9. It is to be understood that the matrix illustrated by FIG. 10 is exemplary only. However, and by way of example, an additional seven matrices identical to that described with reference to FIG. 10 may be connected to the inlets 962 and 964 at the commoning points 966 and 968. Up to six additional inlets having circuitry and connectivity identical to that illustrated by inlets 962 and 964 are implementable.

While the present invention has been described in connection with a preferred embodiment thereof, it is to be understood that additional embodiments, modifications and applications which will become obvious to those skilled in the art are included within the spirit and scope of the invention as set forth by the claims appended hereto.

We claim:

1. A plurality of switches arranged in a plurality of stages of said switches to comprise an expandable switching network with each of said switches comprising:
   means for providing a plurality of inlets for receiving digital signals and a plurality of outlets;
   means for adapting each of said outlets to selectively reflect said digital signals back to any of said inlets;
   means for selectively coupling any of said inlets to any of said outlets to provide an output for said digital signals out of said switch from said outlets;
   means for coupling said signals from the outlets of the switches of any of said stages of switches to the inlets of switches of higher order switching stages; and
   means for reserving said outlets of any of said switches for coupling said digital signals from said outlets to the inlets of switches of said higher order switching stages.

2. A switching network in accordance with claim 1 wherein said switches are space division switches.

3. A switching network in accordance with claim 1 wherein said switches are time division switches.

4. A switching network in accordance with claim 1 wherein said switches are combined space division and time division switches.

5. A switching network in accordance with claim 1 further comprising:
   traffic path selection control means for controlling the path of said digital signals through the network; and
   data storage means for deriving a control signal for accessing said traffic path selection control means such that said control signal is coupled over the same path as said digital signals.

6. A switching network in accordance with claim 5 wherein said digital signals are comprised of a series of samples representing a speech waveform, each of said samples being digitally encoded.

7. A switching network in accordance with claim 6 wherein said encoded digital signals are linear pulse code modulated signals.

8. A switching network in accordance with claim 6 wherein said digital signals are comprised of digitally encoded analog signals.

9. A switching network in accordance with claim 1 wherein each of said inlets and said outlets of said switches includes an input and an output and wherein each of said inputs and outputs of each of said inlets and said outlets receives time division multiplexed signals in a plurality of channels.

10. A combination in accordance with claim 1 including control means for reflecting said digital signals after completion of a partial coupling thru said network, such that said digital signals penetrate said network to the stage required to complete a desired connection.

11. In a telephone switching system for intercoupling a plurality of lines and trunks, an expandable switching network comprised of a plurality of switches, arranged in a plurality of stages, each of said switches comprising:
   means for providing a plurality of inlets for receiving digital signals and a plurality of outlets;
   means for adapting each of said outlets to selectively reflect said digital signals back to any of said inlets;
   means for selectively coupling any of said inlets to any of said outlets to provide an output for said digital signals out of said switch from said outlets;
   means for coupling said digital signals from the outlets of the switches of any of said stages of switches to the inlets of switches of higher order switching stages; and
   means for reserving said outlets of any of said switches for coupling said digital signals from said outlets to the outlets of switches of said higher order switching stages.

12. In a telephone switching exchange in accordance with claim 11, further comprising:
   traffic path selection control means for controlling the path of said digital signals through the network; and
   data storage means for deriving a control signal for accessing said traffic path selection control means such that said control signal is coupled over the same path as said digital signals.

13. A method for providing an expandable switching network from a plurality of switches comprising for each of said switches the steps of:
   receiving a plurality of digital signals at a plurality of inlets of said switch;
   providing a plurality of outlets from said switch to which said signals are selectively coupled from said inlets;
   adapting each of said outlets to selectively reflect said digital signals coupled thereto back to any of said inlets;
   selectively coupling signals from any of said inlets to any of said outlets to provide an output for said digital signals out of said switch from said outlets;

arranging a plurality of said switches into a network of a plurality of stages of said switches;

coupling signals from the outlets of the switches of any of said stages of switches to the inlets of switches of higher order switching stages; and reserving the outlets of any of said switches for coupling said digital signals from said outlets to the inlets of said higher order switching stages.

14. A method for expanding the size of a switching network comprising the steps of:

establishing a plurality of stages of switches, each of said switches having two or more inlets and two or more outlets and being adapted to selectively reflect digital signals entering any inlet thereto back to any other inlet thereof and to couple said signals from any inlet to any outlet;

selectively coupling signals from the outlets of the switches of any of said stages to the inlets of switches of higher order switching stages of said switching network;

adding an additional stage of switches, each of said switches of said additional stage having two or more inlets and two or more outlets and being adapted to selectively reflect digital signals entering any inlet thereto back to any inlet thereof and to couple said signals from any inlet to any outlet; and selectively coupling signals from the outlets of the plurality of stages of switches to the inlets of the switches of said additional stage whereby the outlets of said additional stage of switches are adapted for reflection of said signals and are also reserved for coupling said signals from said outlets to higher order switching stages.

15. A method in accordance with claim 14 wherein said selectively coupling step further provides that no previously coupled outlets of switches in any of said plurality of stages of switches are physically uncoupled from inlets of other switches.

16. A switching network in accordance with claim 1 wherein said network is a one-sided network.

* * * * *